(12) United States Patent
Ruchet et al.

(10) Patent No.: US 8,373,852 B2
(45) Date of Patent: Feb. 12, 2013

(54) OPTICAL WAVEGUIDE ROTATOR MECHANISM, BIREFRINGENCE-INDUCING ELEMENT AND POLARIZATION CONTROL DEVICES EMPLOYING EITHER OR BOTH AND METHODS OF USING SAME

(75) Inventors: Bernard Ruchet, Quebec (CA); Eric Girard, Montreal (CA); Gang He, Quebec (CA)

(73) Assignee: EXFO Inc., Quebec (CA)

( * ) Notice: Subject to any disclaimer, the term of this patent is extended or adjusted under 35 U.S.C. 154(b) by 924 days.

(21) Appl. No.: 12/292,778

(22) Filed: Nov. 26, 2008

(65) Prior Publication Data

US 2009/0135409 A1 May 28, 2009

Related U.S. Application Data

(60) Provisional application No. 60/996,578, filed on Nov. 26, 2007.

(51) Int. Cl.
*G01N 21/00* (2006.01)
*G01J 4/00* (2006.01)
*G02B 5/30* (2006.01)
*G02B 27/28* (2006.01)
*G02B 6/00* (2006.01)

(52) U.S. Cl. .. 356/73.1; 356/364; 356/365; 250/227.17; 359/489.01; 359/489.02; 359/489.03; 385/11

(58) Field of Classification Search .................. None
See application file for complete search history.

(56) References Cited

U.S. PATENT DOCUMENTS

| | | | |
|---|---|---|---|
| 4,389,090 A | 6/1983 | LeFevre | |
| 4,753,507 A | 6/1988 | De Paula et al. | |
| 4,793,678 A | * 12/1988 | Matsumoto et al. | 385/11 |
| 4,832,431 A | 5/1989 | Nolting et al. | |
| 4,898,441 A | 2/1990 | Shimizu | |
| 4,923,290 A | 5/1990 | Brinkmeyer et al. | |
| 4,966,431 A | 10/1990 | Heismann | |
| 4,979,235 A | 12/1990 | Rumbaugh et al. | |
| 4,988,169 A | 1/1991 | Walker | |
| 5,004,312 A | 4/1991 | Shimizu | |
| 5,212,743 A | 5/1993 | Heismann | |
| 5,561,726 A | 10/1996 | Yao | |
| 5,611,005 A | 3/1997 | Heismann et al. | |
| 5,633,959 A | 5/1997 | Niki et al. | |
| 5,903,684 A | 5/1999 | Payton | |
| 6,233,371 B1 | 5/2001 | Kim et al. | |
| 6,266,456 B1 | 7/2001 | Lee et al. | |
| 6,480,637 B1 | 11/2002 | Yao | |
| 6,493,474 B1 | 12/2002 | Yao | |
| 6,618,513 B2 | 9/2003 | Evankow, Jr. | |
| 6,721,468 B2 | 4/2004 | Wood et al. | |
| 6,721,469 B2 | 4/2004 | Kopp et al. | |
| 6,754,404 B2 | 6/2004 | Yao | |
| 6,778,715 B2 | 8/2004 | Ramachandran | |
| 6,873,783 B1 | 3/2005 | Yao | |

(Continued)

OTHER PUBLICATIONS

Extract from TIE/EIA 455-203 of JMG, TIA SC FO-2.3, Mar. 20, 2000 (SP-4669).

*Primary Examiner* — Gordon Stock, Jr.
(74) *Attorney, Agent, or Firm* — Thomas Adams

(57) ABSTRACT

A fiber rotator mechanism for rotating a portion of an optical waveguide, specifically an optical fiber, about a longitudinal axis thereof comprises a motor having a tubular rotor through which the fiber extends, in use, and to which the fiber is secured, directly or indirectly. An optical fiber may be secured by means of a device which also compresses the optical fiber to induce a required birefringence, conveniently by means of a spring-loaded clamping device or a ferrule of shape memory material.

29 Claims, 11 Drawing Sheets

U.S. PATENT DOCUMENTS

| | | |
|---|---|---|
| 6,888,659 B2 | 5/2005 | Allard |
| 6,973,223 B2 * | 12/2005 | Huang et al. .................. 385/11 |
| 6,973,247 B2 | 12/2005 | Fokine et al. |
| 7,066,656 B2 | 6/2006 | Demissy et al. |
| 7,085,052 B2 | 8/2006 | Patel et al. |
| 7,121,731 B2 | 10/2006 | Weynant et al. |
| 7,375,889 B1 | 5/2008 | Kelly et al. |
| 7,436,569 B2 * | 10/2008 | Yao et al. ..................... 359/259 |
| 7,787,728 B2 | 8/2010 | Masterson et al. |
| 7,945,130 B2 | 5/2011 | Yan et al. |
| 2004/0247226 A1 * | 12/2004 | Pyo et al. ....................... 385/11 |
| 2005/0041931 A1 * | 2/2005 | Lampert ......................... 385/81 |

* cited by examiner

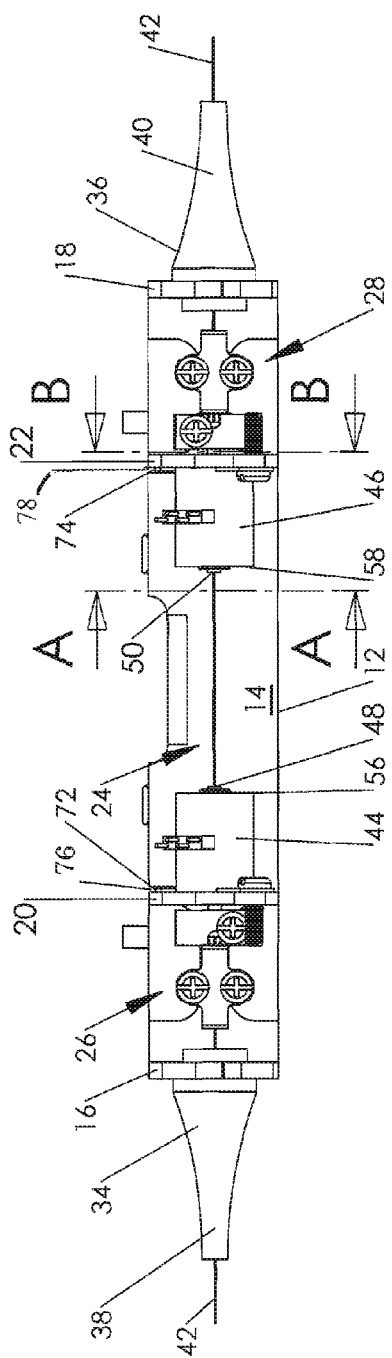
FIG. 2
FIG. 3
FIG. 4

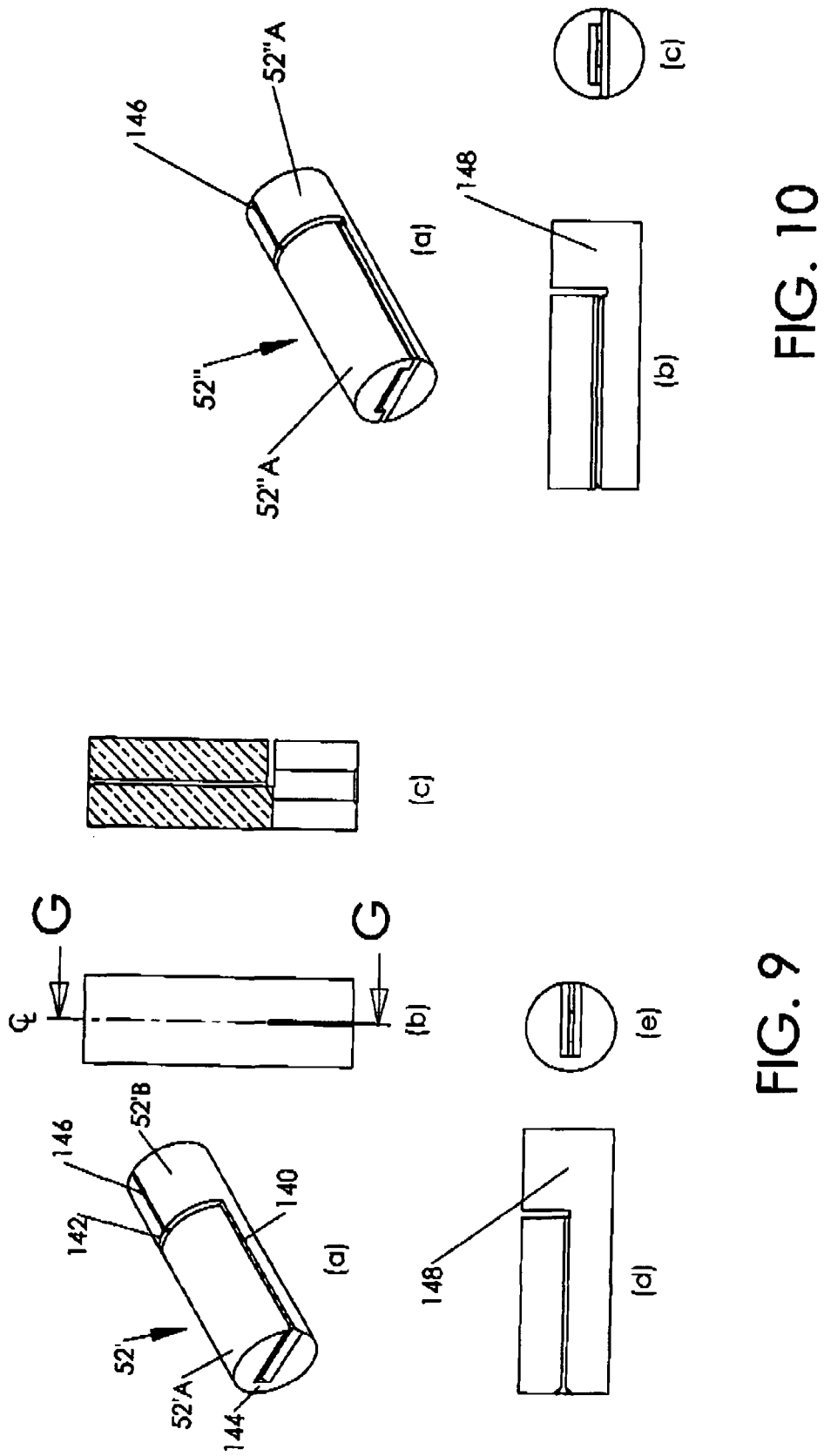

OPTICAL WAVEGUIDE ROTATOR MECHANISM, BIREFRINGENCE-INDUCING ELEMENT AND POLARIZATION CONTROL DEVICES EMPLOYING EITHER OR BOTH AND METHODS OF USING SAME

CROSS-REFERENCE TO RELATED APPLICATIONS

This application claims priority from U.S. Provisional patent application No. 60/996,578 filed Nov. 26, 2007, the contents of which are incorporated herein by reference.

TECHNICAL FIELD

This invention relates to rotator mechanisms and birefringence-inducing elements for optical waveguides, specifically optical fiber, and to methods and devices employing either or both of such rotator mechanisms and birefringence-inducing elements.

BACKGROUND

There are many situations which require rotation of an optical waveguide, specifically an optical fiber about its longitudinal axis. For example, it may be necessary to control, statically or dynamically, e.g., by applying modulation, the state of polarization (SOP) of guided light propagating along the fiber. More particularly, it is sometimes desirable to ensure that a localized birefringence element within the fiber path is optimally aligned with the SOP of the light incident upon it, this in order to effect a transformation of the incident SOP into a substantially different output SOP. It may be desirable to effect one or several such consecutive transformations of the guided-light SOP to randomly vary the SOP of light being used to make measurements, for example to determine polarization mode dispersion (PMD) or polarization-dependent loss (PDL), when it may be desirable to select many different SOPs or even "scramble" the SOP to distribute the SOP, preferably uniformly, around the Poincaré sphere.

In the context of this specification, the verb "control" signifies "to deliberately change or maintain". It does not necessarily entail a knowledge of the specific SOP of the output light.

For use in many commercial applications, such as the testing of links in optical networks, it is desirable for a polarization controller to exhibit or have (i) low PMD, (ii) low insertion loss; (iii) low activation loss; (iv) high power handling capacity; (v) low component cost; (vi) ease of assembly and calibration; (vii) small volume; (viii) low electrical power consumption; (ix) the ability to maintain a fixed SOP stable over a relatively long period of time, for example one hour, where static SOP settings are involved; (x) the ability to stop scrambling abruptly where a particular, generally unknown and randomly chosen SOP is required, for example during PMD or PDL measurements; and (xi) optical path integrity, including having no deleterious effect on the fiber mechanical integrity and having no effect on insertion loss if electrical power is lost.

Although bulk-optics retardance elements, for example a series of half- and quarter-waveplates, can be used to adjust SOP, they are not particularly compact or robust, and have a relatively high insertion loss and handle relatively low power since the light beam must exit the fiber and be collimated for incidence upon the waveplate surfaces, and subsequently be re-injected into a downstream fiber. Also, the size of the bulk-optic elements makes them generally unsuitable for hand-held optical test instruments.

Known polarization controllers which do not use bulk optics may fulfill one or more of requirements (i) to (xi), but not all. Thus, it is known to use one or more variable retardation elements, for example liquid crystal devices, as disclosed in U.S. Pat. No. 4,979,235 and U.S. Pat. No. 7,085,052, but they disadvantageously do not fulfill requirements (i) to (vi) and, in some cases, requirement (viii).

U.S. Pat. No. 6,973,247 discloses a polarization controller in which an optical fiber is heated by means of an internal electrode so that expansion causes compression forces which change the birefringence of the fiber. While such a controller might satisfy many of requirements (i) to (x) it is unlikely to provide long-term stability or be small and inexpensive to produce. Certainly, it would not be able to stop scrambling abruptly.

Polarization controllers also are known which bend an optical fiber to induce birefringence and then rotate the bent fiber, thereby controlling the SOP of light propagating in the optical fiber, as disclosed, for example, in U.S. Pat. No. 4,389,090 and U.S. Pat. No. 4,793,678. Disadvantageously, such devices usually require a relatively large volume because of the length of the optical fiber and its limited bending radius, and, even if motorized, would operate relatively slowly.

It is also known to apply a variable transverse compressive force to a length of optical fiber so as introduce stress-induced birefringence photo-elastically, thereby controlling SOP of light propagating along the fiber. Examples are disclosed in U.S. Pat. Nos. 6,480,637, 6,493,474, 6,754,404 and 6,873,783, all by X. Steve Yao, who explains that applying such transverse compressive force, induced electrically by a piezo-electric actuator (PEA) or the like, to different portions of the fiber by means of several "fiber squeezers" which have different orientations and apply different compressive forces, allows the SOP of the light in the fiber to be rotated about orthogonal axes on the Poincaré sphere. Drawbacks of such a PEA "fiber squeezer"-based polarization controller, however, include relatively high PMD, since the applied birefringence corresponds to a higher-order waveplate so as to operate in the approximately linear displacement regime of the PEA, inability to maintain a fixed SOP stable over a lengthy period of time, relatively large volume and relatively difficult assembly and calibration. Also, relatively high voltages need be applied to piezo-electric crystals, which might be hazardous in explosive environments, for instance, and the high fiber stress levels that need be applied for higher-order waveplate behavior have implications for optical path integrity.

In his U.S. Pat. No. 5,561,726, X. Steve Yao discloses a polarization controlling apparatus comprising two spaced anchorages for securing opposite distal portions of the fiber to prevent their rotation. A rotatable fiber squeezer positioned between the two anchorages applies compressive force to the medial portion of the fiber to change its birefringence. The fiber-squeezer itself is rotated about the longitudinal axis of the fiber so as to twist it relative to the anchorages, thereby to adjust the SOP of light propagating along the fiber.

Although this apparatus may be well suited for the primary application described in U.S. Pat. No. 5,561,726, namely polarization state "adjustment", it is not entirely satisfactory or really suitable for use as a polarization scrambler, where uniform mapping of a, generally arbitrary, SOP onto the Poincaré sphere is required. For instance, for a certain arbitrary input SOP, it may be very difficult to select a desired output SOP (i.e., very sensitive to the rotation and/or pressure adjustment), whereas for the same input SOP, it may be very easy to select a different SOP (i.e., the sensitivity of the rotation and/or pressure adjustment can vary strongly with desired output SOP). For this reason, this device would not be very suitable for adaptation (e.g., by replacing the pressure screw of the fiber-squeezer with a PEA) so that it functioned as a random polarization scrambler that uniformly covered the Poincaré sphere. Moreover, his polarization controller design would not be entirely satisfactory for incorporating into a hand-held test instrument because the diameter of the rotatable fiber-squeezer (including the PEA) would be relatively large.

A further disadvantage of compressing portions of the fiber by means of a PEA is that it may increase the risk of fracturing and breaking of the fiber, since, in order to maintain this PEA in the linear response regime, the applied stress on the fiber induces a birefringence that corresponds to a high-order waveplate, i.e., more than the 0 to $\lambda$ retardance range necessary for a basic polarization controller or scrambler. In U.S. Pat. No. 6,493,474, Yao discusses prior U.S. Pat. No. 4,988, 169 (Walker), U.S. Pat. No. 4,753,507 (De Paula et al.) and U.S. Pat. No. 5,903,684 (Payton) and explains that problems arise because the applied pressure causes fracturing and breakage of the fiber. Yao decries attempts to solve the problem by coating the fiber with metal prior to applying pressure on the grounds that uniform metal coatings are not easily reproducible in production. Yao proposes instead polishing the fiber-squeezing surfaces to reduce irregularities to less than 100 microns and providing a polyimide coating between the fiber core and the surface upon which the fiber squeezers act. This approach also is not entirely satisfactory, however, because such polishing is time consuming and costly, thus in contradiction with either or both of requirements (v) or (vi) enumerated hereinbefore.

SUMMARY OF INVENTION

An object of the present invention, according to its different aspects, is to at least mitigate one or more of the deficiencies of known such polarization controllers, or at least provide an alternative.

According to a first aspect of the present invention, there is provided a polarization control device for controlling the state of polarization (SOP) of light propagating along an optical fiber, the polarization controlling device comprising:

drive motor means comprising a stator and a tubular rotor;
fiber squeezer means mounted to the tubular rotor for rotation therewith;
said optical fiber extending through said tubular rotor and said fiber squeezer means,
said fiber squeezer means squeezing a portion of said fiber to secure said fiber to said fiber squeezer means for rotation therewith and to induce a predetermined linear birefringence in said portion;
the drive motor means being operable to rotate the fiber squeezer means and therewith said portion of the optical fiber and thereby control said state of polarization (SOP) of light propagating through said optical fiber.

Because the fiber portion extends through the tubular rotor, with its longitudinal axis substantially coincident with the axis of rotation, such a polarization control device advantageously may occupy a relatively small space.

According to a second aspect of the invention, there is provided a polarization control device for controlling state of polarization (SOP) of light propagating along an optical fiber, the polarization controlling device comprising at least first and second drive motor means mutually-spaced along said optical fiber, each comprising:

a stator and a tubular rotor;
said optical fiber extending through said tubular rotor of each drive motor means and being coupled to each said tubular rotor for rotation therewith, and
a birefringence-inducing element for inducing a predetermined linear birefringence in a respective one of first and second mutually-spaced portions of the optical fiber;
the polarization control device further comprising control means for controlling said first and second drive motor means to rotate said first and second portions, respectively, and thereby control state of polarization (SOP) of light propagating through said optical fiber, wherein the control unit is operable to control respective rotation angles of the at least two birefringence-inducing elements according to predetermined criteria so as to select in succession a multiplicity of SOPs distributed substantially uniformly around the Poincaré sphere.

According to a third aspect of the invention, there is provided a polarization control device for controlling state of polarization (SOP) of light propagating along an optical fiber, the polarization controlling device comprising:

drive motor means comprising a stator and a tubular rotor;
said optical fiber extending through said tubular rotor and being coupled to said tubular rotor for rotation therewith; and
a birefringence-inducing element for inducing a predetermined linear birefringence in a portion of the optical fiber;
the drive motor means being operable to rotate the portion of the optical fiber and thereby control said state of polarization (SOP) of light propagating through said optical fiber,
wherein said birefringence-inducing element comprises first and second anvil members having respective anvil surfaces juxtaposed to receive said fiber portion therebetween, the anvil members being connected together at one side by hinge means and pivotable relative to each other, and spring-loaded screw-clamping means for biasing the first and second anvil members together so as to apply a predetermined compressive force to the optical fiber portion extending between said juxtaposed respective anvil surfaces, thereby to induce said birefringence.

According to a fourth aspect of the invention, there is provided a polarization control device for controlling state of polarization (SOP) of light propagating along an optical fiber, the polarization controlling device comprising:

drive motor means comprising a stator and a tubular rotor;
said optical fiber extending through said tubular rotor and being coupled to said tubular rotor for rotation therewith,
a birefringence-inducing element for inducing in a portion of the optical fiber a predetermined linear birefringence;
the drive motor means being operable to rotate the portion of the optical fiber and thereby control said state of polarization (SOP) of light propagating through said optical fiber,
wherein the birefringence inducing means comprises a ferrule attached co-axially to the tubular rotor so that the optical fiber extends through both the ferrule and the rotor, at least a part of the ferrule comprising shape memory material deformable when heated temporarily from an initial shape to a shape suitable for accommodating the fiber, subsequent cooling of the shape memory material causing the shape memory material to attempt to restore said original shape thereby applying transverse compressive force to said fiber to induce said predetermined linear birefringence therein.

In the context of this specification, the term "optical fiber" embraces standard silica-based fiber widely used in telecommunications (e.g. SMF-28 from Corning) and other types of waveguide, such as recently developed fiber types, including photonic crystal fiber, hole-assisted fiber, or the like.

In embodiments of the second, third and fourth aspects of the invention, the birefringence-inducing means may be coupled to said tubular rotor for rotation therewith.

In embodiments of foregoing aspects of the invention having a control unit for controlling the drive motor means to obtain a desired rotation of the portion of optical fiber the control unit may be arranged to rotate the rotor through a predetermined angle to a set position, or to series of different angular positions in succession, or even to cause the rotor to rotate in an oscillatory fashion between extreme rotation angles.

The control unit may rotate said rotor to a series of set positions in succession to select a multiplicity of SOPs distributed around the Poincaré sphere, or even to cause the fiber portion to rotate in an oscillatory fashion over a range of rotation angles so as to apply relatively low frequency modulation of the SOP of light propagating along the fiber, or to apply semi random scrambling of the SOP states.

Preferably, the polarization controlling device comprises at least two of said birefringence-inducing elements and associated drive motor means mutually-spaced along the optical fiber, and the control unit controls respective rotation angles of said at least two birefringence-inducing elements to distribute the SOPs around the Poincaré sphere.

Where at least two birefringence-inducing elements are rotated according to predetermined criteria, and the SOP of the light entering the fiber portion within the first birefringence-inducing element is substantially linear, substantially uniform distribution of the SOPs around the Poincaré sphere can be achieved. If the SOP of the light entering the fiber portion is arbitrary, however, it is preferable to use four or more birefringence elements to achieve a desired uniform distribution. The or each birefringence-inducing element may comprise means for applying a transverse compressive force to said portion of said fiber so as to induce said birefringence therein.

The compressive force applying means may comprise spring-loaded screw-clamping means for clamping said portion of the optical fiber.

The compressive force applying means may comprise first and second anvil members having respective anvil surfaces juxtaposed, and means for biasing the first and second anvil members together so as to apply a compressive force corresponding to a predetermined induced birefringence to the optical fiber portion extending between said juxtaposed reeve anvil surfaces.

The biasing means may urge the anvil surfaces together resiliently. The anvil members may be connected together at one side by a hinge means and pivot relative to each other. The anvil members and hinge may conveniently be formed from a single block of material.

Preferably, the biasing means comprises at least one adjustment screw and a compression spring for transmitting force from the screw to bias the first anvil means resiliently towards the second anvil means, the screw permitting adjustment of the biasing force.

The biasing means may comprise two of such adjustment screws and compression springs disposed either side of the longitudinal axis of the fiber, when inserted.

Alternatively, the compressive force applying means may comprise a ferrule attached co-axially to the tubular rotor so that the optical fiber extends through both the ferrule and the rotor, at least a part of the ferrule comprising an elastic mechanical clamp or compressive structure For instance, such a clamp or compressive structure may comprise so-called shape memory material that is deformed temporarily from an initial shape, perhaps after heating, to a shape suitable for accommodating the fiber, whereby subsequent attempted restoration of the shape memory material to said initial shape applies pressure to said fiber.

The birefringence-inducing pan of the ferrule may comprise two substantially semi-cylindrical members cooperating to form a portion of the ferrule. The semi-cylindrical members may be joined together by, for example, crimping, (ultrasonic) welding, or a bonding agent, such as adhesive, glass solder or metallic adjunction.

The two substantially semi-cylindrical members may be formed from materials having different temperature coefficients, the difference between the temperature coefficients being selected so that temperature-sensitive changes in the compressive force compensate, at least partially, for temperature-sensitive variations of the birefringence of the portion of the optical fiber.

Where the two substantially semi-cylindrical members are bonded together by a layer of adhesive, the adhesive material might be selected so that it provided at least part of the required temperature compensation.

The dimensions and elongation coefficient of the birefringence-inducing portion will be determined according to the characteristics of the fiber and the compressive forces required to induce the required degree of birefringence.

The rotor-attachment portion of the ferrule also may comprise shape memory material, the dimensions and elongation coefficient of such rotor-attachment portion being determined so that the female is secured to rotor effectively.

Both the birefringence-inducing ferrule portion and the rotor-attachment ferrule portion may comprise the same shape memory material.

In embodiments of the first aspect of the invention, the fiber squeezer means may comprise a ferrule having a central bore sized to accommodate the optical fiber, at least a part of the ferrule comprising a shape memory material deformable by mechanical force and/or heating to increase the bore size temporarily to accommodate the fiber, the arrangement being such that, upon removal of the mechanical force and/or heating, the shape memory material attempts to reduce the bore size, thereby applying a predetermined transverse compressive force to said fiber so as to induce said predetermined birefringence therein.

The ferrule may comprise parts having different temperature coefficients selected, in conjunction with physical dimensions of the ferrule, so as to vary the transverse compressive force in dependence upon temperature and compensate at least partially for temperature-dependent changes in the birefringence of the optical fiber.

Where the two substantially semi-cylindrical members are bonded together by a layer of adhesive, the adhesive material might be selected so that it provided at least part of the required temperature compensation.

According to still another aspect of the invention, there is provided a method of measuring speckle-dependent loss of a device-under-test and/or fiber link-under-test (DUT) using a polarization control device comprising drive motor means comprising a stator and a tubular rotor, a multimode optical fiber extending through said tubular rotor, a portion of said fiber exhibiting a predetermined linear birefringence and being coupled to said tubular rotor for rotation therewith, the drive motor means being operable to rotate the portion of the optical fiber and thereby control states of polarization (SOP) for respective different transverse modes comprising the light propagating through said optical fiber, the method comprising the steps of:

propagating multimode light having multiple transverse guided modes through said multimode optical fiber and subsequently into said DUT, controlling the drive motor means to rotate said portion of optical fiber so as to produce a time-varying modal interference pattern of the light exiting the DUT, and subsequently collecting and detecting substantially all of said exiting light over a prescribed time period, said speckle-dependent loss being determined from a ratio between maximum and minimum power levels of the detected light over said prescribed time period.

According a yet a further aspect of the invention, there is provided a method of determining a near field spatial profile of multimode light under test (MLUT) using a polarization control device to control states of polarization (SOP) corresponding to respective different transverse modes of light exiting a multimode optical fiber, the polarization control device comprising drive motor means comprising a stator and a tubular rotor, said multimode optical fiber extending through said tubular rotor, a portion of said fiber exhibiting a predetermined linear birefringence and being coupled to said tubular rotor for rotation therewith, the method comprising the steps of:

operating the drive motor means to rotate said portion of the optical fiber and thereby cause time-varying changes in optical speckle of the light exiting said fiber;

undertaking a plurality of power measurements of said multimode light under test (MLUT) that are spatially distributed in the near field, each measurement detecting a spatial fraction of the total optical power with an effective measurement bandwidth less than the rate at which said time-varying changes occur, said plurality of measurements determining said near field spatial profile.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF DRAWINGS

In the drawings, identical or corresponding elements in the different Figures have the same reference numeral.

FIG. 2 is a plan view of the polarization controller of FIG. 1;

FIG. 3 is a cross-sectional view taken on line A-A of FIG. 2;

FIG. 4 is a cross-sectional view taken on the line B-B of FIG. 2;

FIGS. 9(a) to 9(e) are perspective, plan, sectional plan, side and end views, respectively, of a birefringence element of the embodiment of FIG. 8;

FIG. 10(a) to 10(c) are perspective, side and end views, respectively, of a modification to the birefringence element of FIGS. 9(a) to 9(e);

DETAILED DESCRIPTION OF PREFERRED EMBODIMENTS

Figure 1:
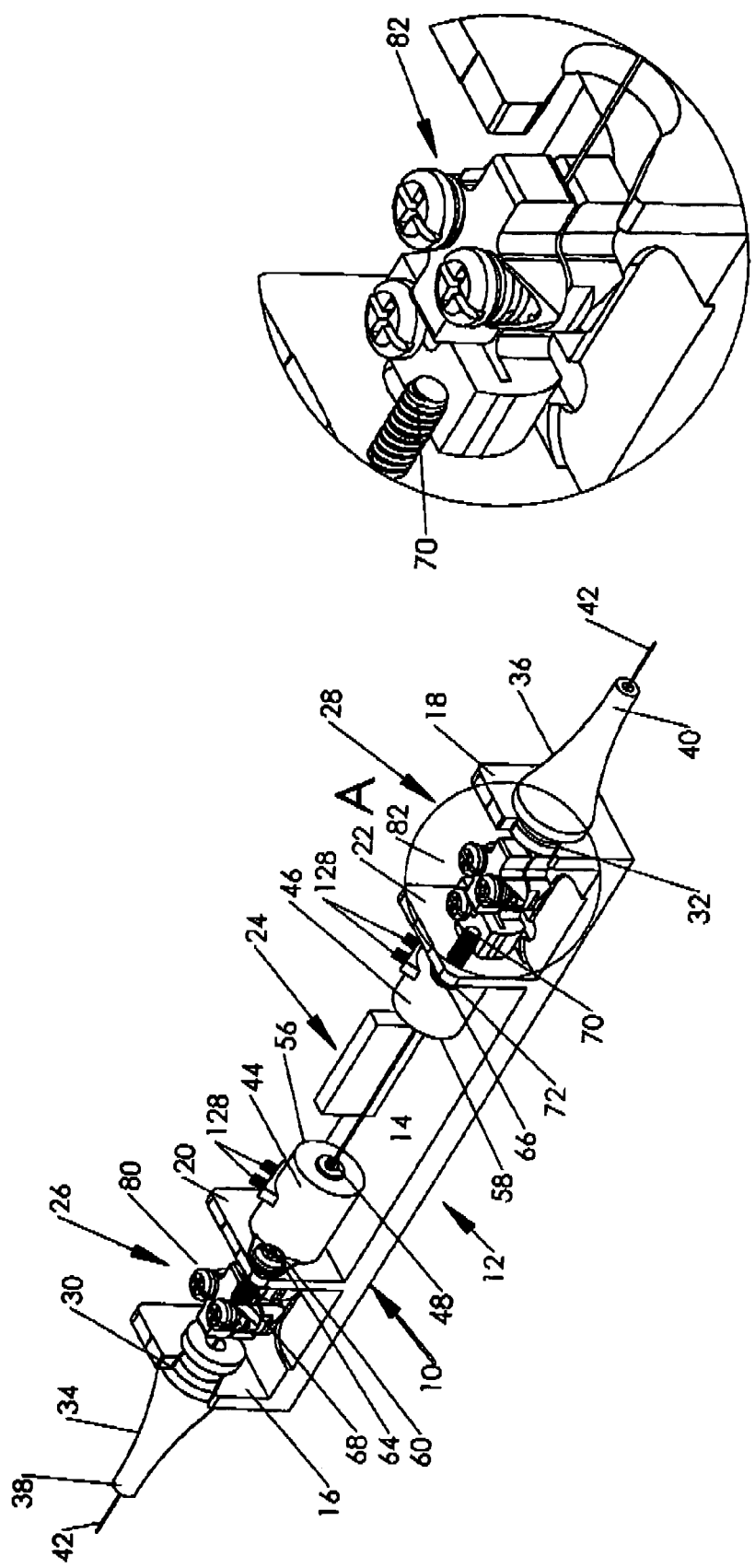
FIG. 1 is a schematic perspective view of a polarization controller which constitutes a first embodiment of the invention, FIG. 1A being an inset view showing a detail to a larger scale.
Figure 5:
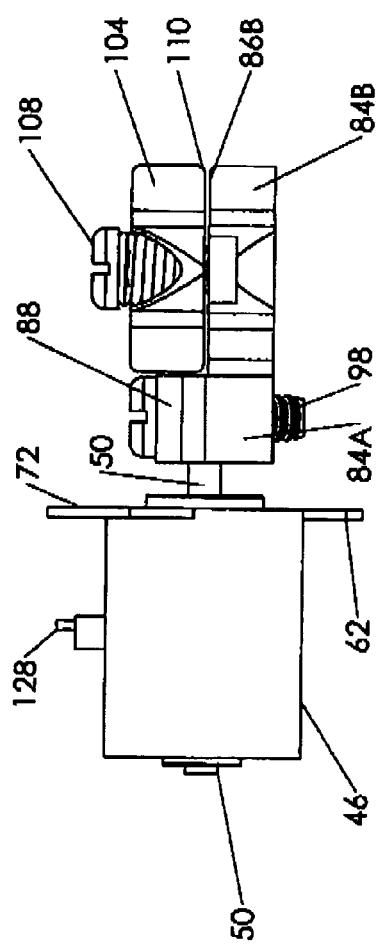
FIG. 5 is a side view of a fiber clamp assembly and drive motor of FIGS. 1 and 2.
Figure 6:
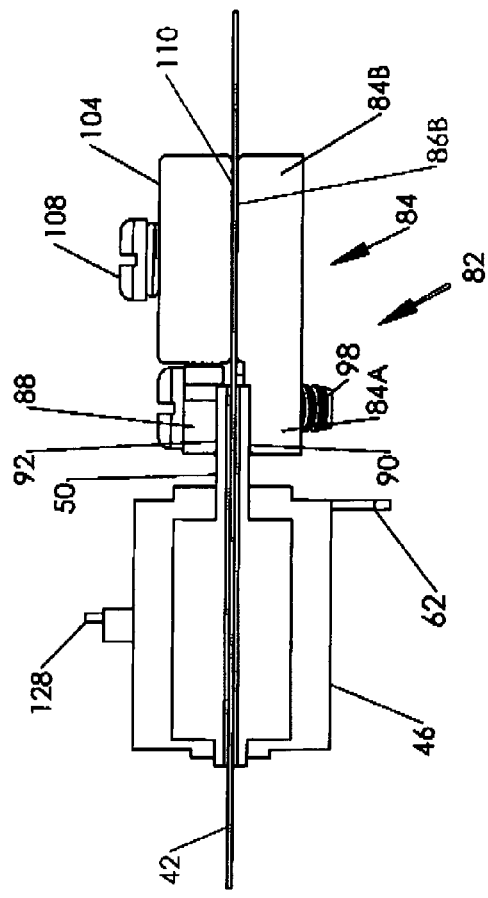
FIG. 6 is a medial longitudinal cross-sectional view of the fiber clamp assembly and drive motor of FIG. 5.
Figure 7:
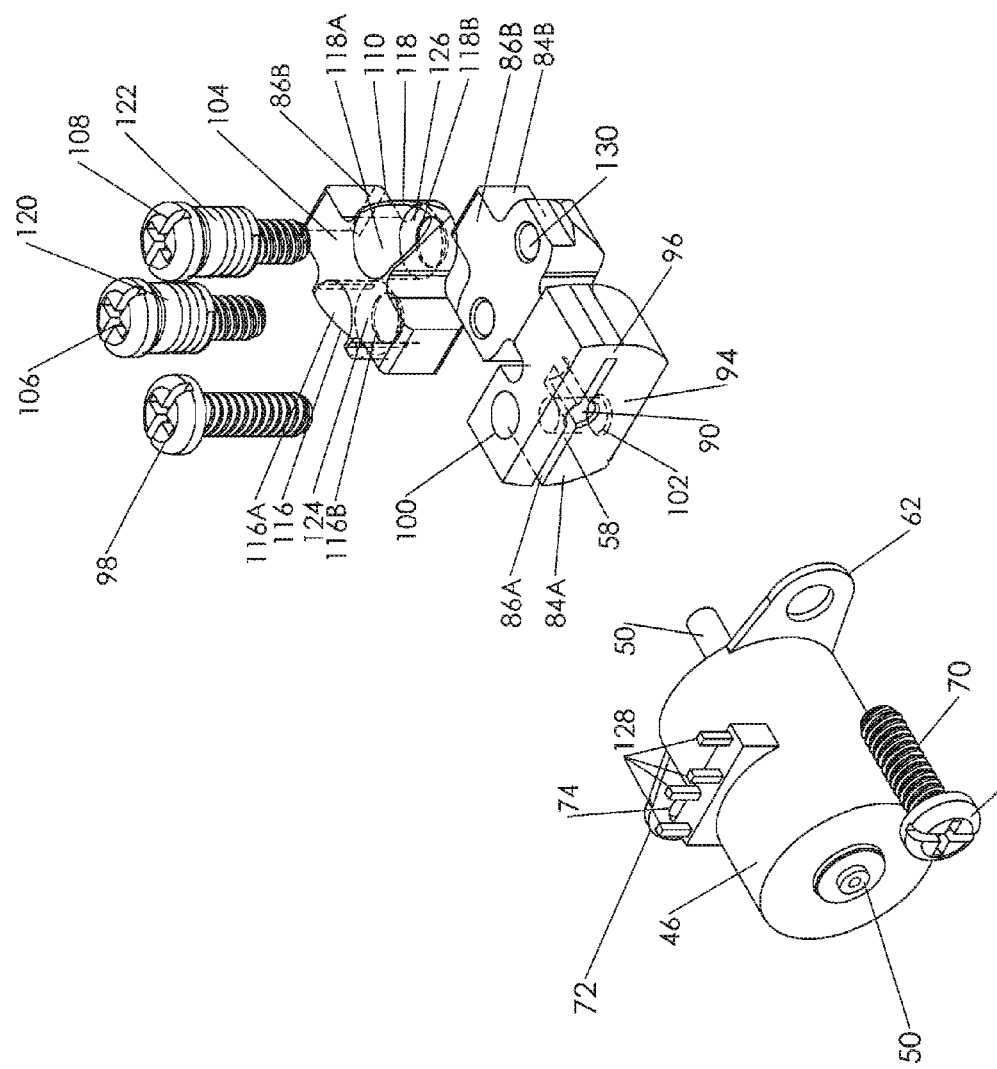
FIG. 7 is an exploded view of the fiber clamp assembly and drive motor of FIG. 5.

FIG. 1 illustrates a first embodiment of a polarization controller 10 for controlling the state of polarization of light propagating along an optical fiber extending through the polarization controller. In practice, an input end of the optical fiber might be connected upstream to a light source, such as a laser, and an output end might be connected to a downstream device, for example a polarizer. The polarization controller 10 comprises two birefringence-inducing elements and associated motors, and hence is appropriate for use when the SOP of the input light, i.e., the light propagating in the optical fiber upstream of the first birefringence-inducing element, is approximately linear. The polarization controller 10 comprises a support member 12 in the form of an elongate base plate 14 having four similar flanges spaced apart along its length and projecting substantially perpendicularly from one side thereof (shown upwards in FIG. 1). Flanges 16 and 18 are positioned at opposite ends of the base plate 14 and intermediate flanges 20 and 22 are each spaced a similar distance from the adjacent end flange. A casing (not shown) fits over the support member 12 and onto the uppermost edges of the flanges to define a middle compartment 24 and outer compartments 26 and 28 between the flanges.

End flanges 16 and 18 have central holes 30 and 32, respectively. Resilient grommet members or "boots" 34 and 36 have grooved end portions engaged in holes 30 and 32 of end flanges 16 and 18, respectively, and have outwardly projecting strain-relief portions 38 and 40, respectively, for inhibiting excessive flexing of an optical fiber 42 which extends through the boots 34 and 36 and throughout the length of the support member 12.

Two drive motors 44 and 46 are mounted to the innermost sides of intermediate flanges 20 and 22, respectively, so that their respective rotors 48 and 50 (see also FIGS. 3 and 4) extend through central holes (only one hole 52 shown—FIGS. 3 and 4) in the intermediate flanges 20 and 22, respectively. Outer casings 56 and 58 of drive motors 44 and 46 have lobes 60 and 62 (see FIGS. 2 and 3), respectively, each extending laterally. The lobe portions 60 and 62 are secured to the associated intermediate flanges 20 and 22 by screws 64 and 66 whose shanks 68 and 70, respectively, engage in corresponding screw threaded holes (not shown) of the flanges 20 and 22, respectively. The outer casings 56 and 58 also have lobes 72 and 74, respectively (see FIGS. 2 and 3), which extend, (diametrically-oppositely from the lobes 60 and 62, respectively) to engage in respective slots 76 and 78 in the base plate 14 at positions adjacent flanges 20 and 22, respectively. Thus, the lobes 60, 62, 72 and 74 attach the drive motors 44 and 46 non-rotatably to the flanges 20 and 22, respectively.

The drive motor rotors 48 and 50 extending into the endmost compartments 26 and 28, respectively, support fiber clamping assemblies 80 and 82, respectively, each of which clamps that portion of optical fiber 42 extending through the corresponding compartment Fiber clamping assemblies 80 and 82 and their respective drive motors 44 and 46 are identical, so, for simplicity of the description, only fiber clamping assembly 82 and associated drive motor 46 will be described in more detail hereinafter, with additional reference to FIGS. 1A, 5, 6 and 7.

As shown, fiber clamping assembly 82 comprises an anvil member 84 having a generally flat bearing surface extending in a plane which, in use, will be common to both the rotation axis of the motor 46 and the longitudinal axis of the optical fiber 42. The anvil member 84 has a first portion 84A and a second portion 84B, having surfaces 86A and 86B, respectively. A clamp member 88 similar to the anvil end portion 84A cooperates with anvil portion 84A to secure the rotor 50. Thus, anvil surface 86A has a central part-cylindrical groove 90 extending in the direction of the motor rotation axis, which cooperates with a similar part-cylindrical groove 92 in the surface 94 of clamp member 88 juxtaposed to the anvil surface 86A so that, in use, the grooves 90 and 92 present bearing surfaces spaced apart to receive the rotor 50 between them. The clamp member 38 is attached to the anvil end portion 84A by a hinge member 96 (See FIG. 7) which permits the clamp member 88 to pivot relative to the anvil end portion 84A. The hinge 96 takes the form of a flexure formed integrally with the clamp member 88 and anvil portion 84A by machining a slot between them and leaving a vestigial strip at one side to form the flexure hinge 96. A screw 98 extends through a clearance hole 100 in the clamp member 88 to engage in a screw-threaded hole 102 in the subjacent anvil end portion 84A. Tightening of screw 98 secures the fiber clamping assembly to the rotor 50.

At the other end of the fiber clamping assembly 82, a compression block 104 is attached to the adjacent anvil portion 84A by two clamping screws 106 and 108, respectively, so that surface 110 of compression block 104 is juxtaposed to the surface 86B of anvil portion 84B. Anvil surface 86B and compression block surface 110 are spaced apart to engage opposite sides of the optical fiber 42 extending therebetween, in use. The clamping screws 106 and 108 extend in through-holes 116 and 118, respectively, in the compression block 104. The through-holes 116 and 118 have larger diameter hole sections 116A and 118A, conveniently counter bored, to receive and partially accommodate compression springs 120 and 122, respectively, surrounding clamping screws 106 and 108, respectively. At their outermost ends, the compression springs 120 and 122 bear against the heads of the clamping screws 106 and 108, respectively. At their innermost ends, the compression springs bear against shoulders 124 and 126 formed at the transition between the counter-bored sections of holes 116 and 118 and the narrower diameter innermost hole sections 116B and 118B, respectively.

The shanks of clamping screws 106 and 108 engage in screw-threaded holes 128 and 130, respectively, in anvil portion 84B. When the clamping screws 106 and 108 are tightened, they apply a biasing force via the springs 120 and 122 to shoulders 124 and 126, respectively, to urge the compression block 104 towards the opposed anvil surface 86B and compress the portion of optical fiber 42 extending between the juxtaposed surfaces 110 and 86B of block 104 and anvil portion 84B, respectively, causing the birefringence of that portion of optical fiber 42 to change. The degree to which the screws are tightened, and the spring constant of each spring, will determine the compression force applied and, as is known to those skilled in this art, the compression force will determine the degree of induced retardation between the fast and slow axes of the optical fiber. As a result, the compressed portion of the optical fiber 42 will behave like a waveplate.

It has been found empirically that a suitable retardance for this birefringence-induced waveplate is λ/3.2, this value not being critical. The validity of this approach to attain the desired retardance has been confirmed using standard polarimetic techniques well known to those skilled in the art, and hence, in production it is not generally necessary to repeat such an optical validation, thereby simplifying the production process.

The rotational position of the fiber clamping assembly 82, and hence the orientation of the axes of the wave plate, can be changed by applying a suitable drive current to terminals 128 of the motor 46, causing its rotor 50 to rotate the clamping assembly 82. A suitable control circuit for controlling both motors 44 and 46 is shown in FIG. 11(*a*) and comprises motor drive circuits 130 and 132 for supplying drive current to motors 44 and 46, respectively. The drive circuits 130 and 132 are themselves controlled by a microcontroller 134.

It should be noted that, during assembly, the orientation of the pressure-inducing clamp may need to be chosen so as to correspond to a "zero-point" or "mid-point" position of the rotor of the motor (be it a stepping motor, galvanometer, DC motor or any other rotation-inducing element). Also, mechanical stops may be provided to preclude excess rotation. A typical rotational degree of freedom of each motor is +/−90 degrees from the midpoint.

It should be appreciated that the particular application for which the polarization controller is being used will determine how the drive motors 44 and 46 are to be operated and, hence, how the microcontroller 130 will be programmed Thus, where input light propagating along the fiber is substantially linearly polarized, the drive motors 44 and 46 might comprise stepper motors and the drive circuits 130 and 132 apply drive current to rotate the rotors 48 and 52 to set positions and so set the orientation of the SOP and maintain it as required.

Where the polarization controller is required to serve as a "discrete" or "step-by-step" polarization scrambler which distributes the discretely-chosen SOPs, preferably uniformly, about the Poincaré sphere, the microcontroller 134 could cause each of the motors 44 and 46 to select, in succession, a multiplicity of different rotation angles. The following relationship between the angular positions of their respective rotors, at any given time, has been found to lead to satisfactory scrambling: each motor moves to each discrete angular orientation ("step") within its operating range with an approximately equal probability, and the ratio between the discrete angular change of any particular one of the motors and the contemporaneous discrete angular change of any one of the other motors is chosen to closely approximate an irrational number, such as, for instance, 1.618 . . . , the well-known "golden ratio".

When, due to the finite resolution of the stepping motor (or DC motor with optical encoder, or the like) microsteps, it is not possible to closely attain this approximation to an irrational number, the sequence of step intervals can be chosen to obtain this ratio on average over multiple steps. It should be noted that, if the application of the desired angular change from a particular step position would cause the angular position of the rotor to exceed the allowed absolute rotation angle, the subsequent step position is chosen by counting the number of microsteps to the said allowed maximum angle and then continuing the count in the reverse direction.

Such a polarization controller could be used in the device disclosed in commonly-owned co-pending International patent application No. PCT/CA2008/00057 filed Mar. 28, 2008 published as WO2008/116314 on Oct. 2, 2008, the contents of which are incorporated herein by reference.

It is also envisaged that the microcontroller 134 and drive circuits 130 and 132 could cause the rotor of each motor to rotate in an oscillatory fashion between extreme angles of rotation, with the effect of modulating the SOP of the light propagating along the fiber 48. The relationship between the rotation angles of the respective rotors at any instant then would be controlled to apply a desired modulation to the light.

Figure 12:
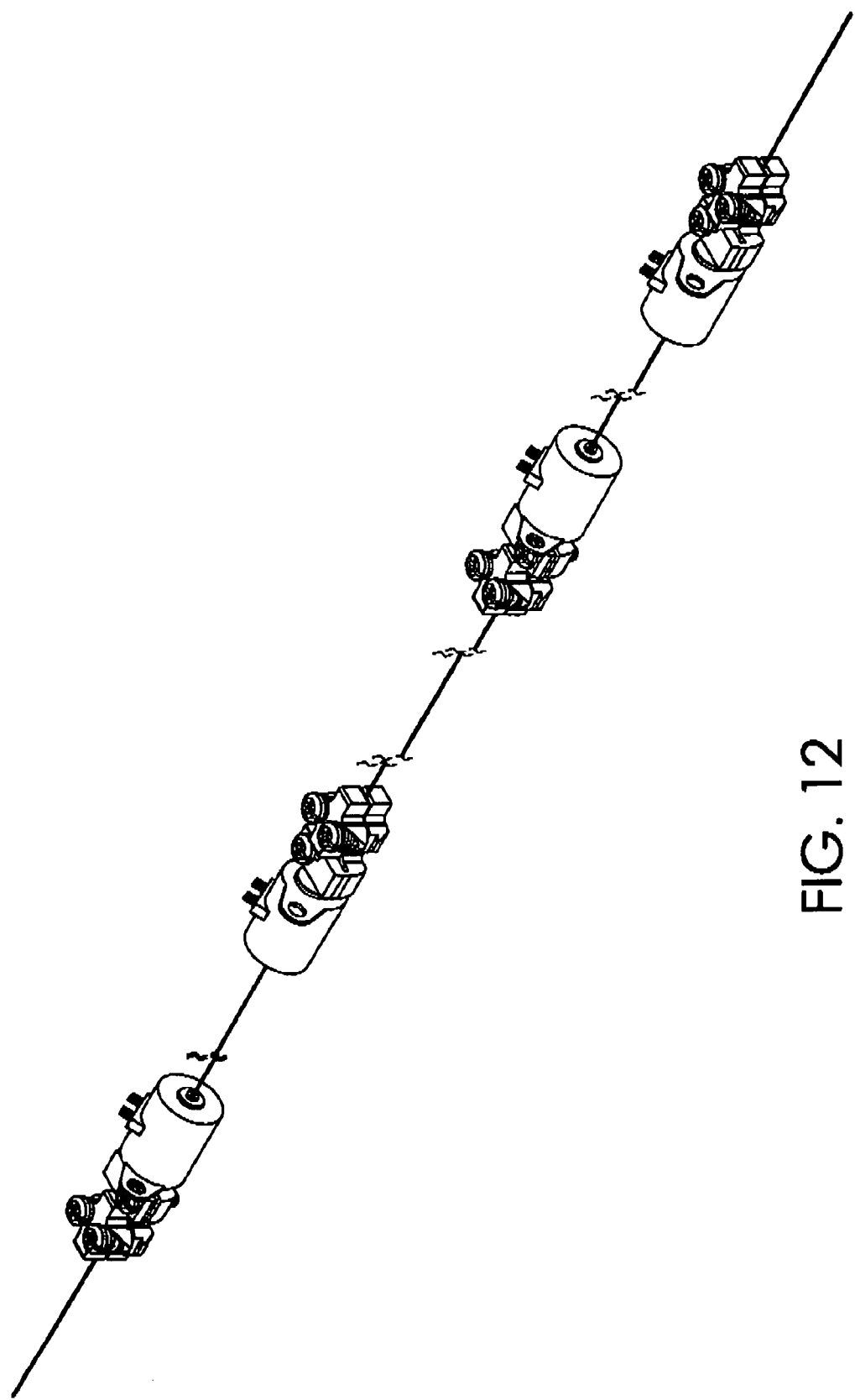
FIG. 12 is a perspective view of an embodiment of the present invention employing four fiber clamping assemblies and associated drive motors.

The number of rotatable birefringence-inducing mechanisms (motor-coupled fiber-squeezers) will be determined for a particular application. Although a single fiber squeezer could be used, it is expected that for those applications where the SOP input to the polarization controller is known and approximately linear (i.e. the semi-major axis of the polarization ellipse is much greater than the semi-minor axis), two motor-coupled fiber-squeezers, as shown in FIGS. 1 and 2, will provide sufficient polarization control. FIG. 12 illustrates the use of four motor-coupled fiber-squeezers, which would be more appropriate for the case where the SOP input to the polarization controller is unknown. The four motor-coupled fiber-squeezers need not be in the same casing but could be distributed at relatively large intervals along the optical fiber.

The use of additional motor-coupled fiber-squeezers may lead to improved temporal scrambling (as described by Patel and Zhuang in U.S. Pat. No. 7,085,052, in the context of a completely different polarization controller design) and could be appropriate for those applications requiring "fast" scrambling. However, for most applications, it is unlikely that the benefits obtained by using five or more rotatable birefringence-inducing elements would justify the cost and complexity.

Figure 11A:
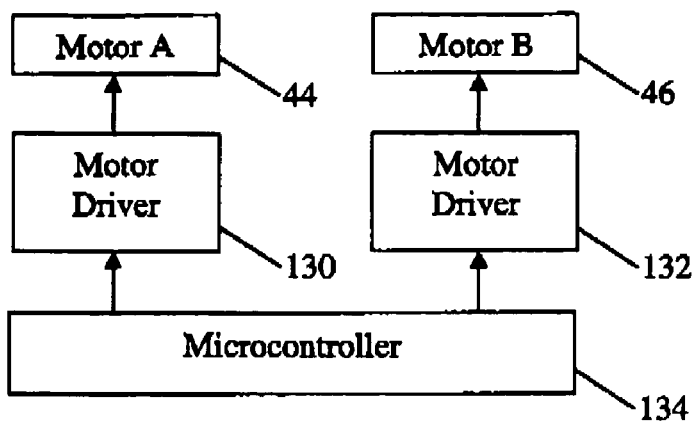
FIGS. 11(a) and 11(b) are block schematic diagrams of control circuits for different embodiments of the invention.
Figure 11B:
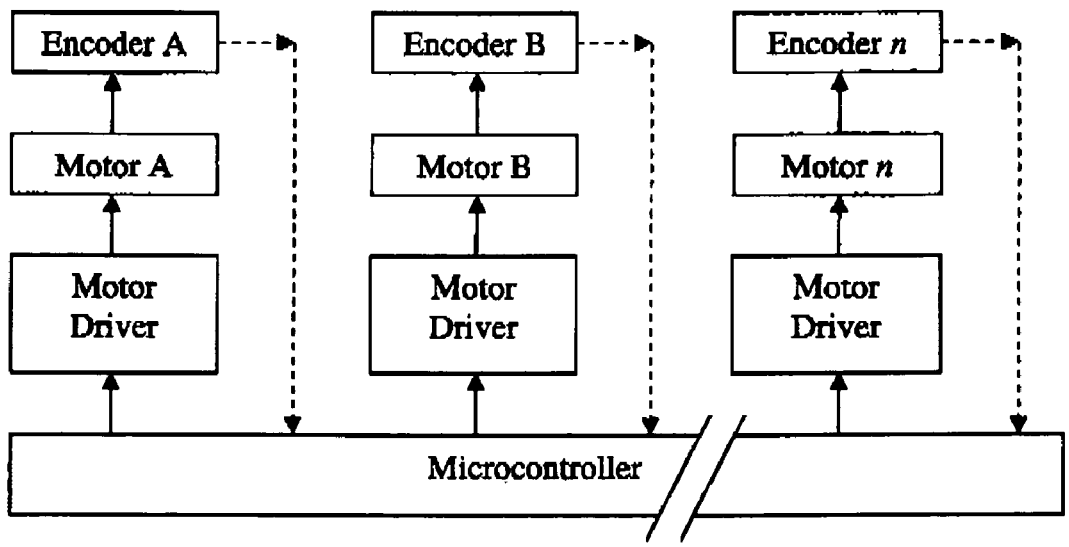

The drive circuit arrangement shown in FIG. 11(a) is open-loop. If desired for a particular application, however, closed-loop control could be provided. Thus, FIG. 11(b) is similar to FIG. 11(a) in that it illustrates a plurality of n motors and their respective motor drive circuits controlled by a microcontroller 134'. However, a plurality of n encoders are shown, each associated with a respective one of the motors, and coupled to the microcontroller to supply a feedback signal to the microcontroller.

It should be appreciated that each encoder usually would be coupled to a sensor for detecting whatever parameter was appropriate, for example SOP of the light propagating along the fiber, rotor angle, and so on.

It should be appreciated that the rotation of the fiber should not exceed its elastic limit and thereby compromise the optical path integrity. According to data supplied by Corning, Inc. in an application note for Corning SMF-28 and SMF-28PF optical fiber, the following values were determined to be acceptable for these or equivalent fibers:

| St (Pa)  | G (Pa)  | r (m)    | q (rad)  | L (m)    |
|----------|---------|----------|----------|----------|
| 2.43E+08 | 3.1E+10 | 6.25E−05 | 3.141592 | 2.50E−02 |
| 1.45E+08 | 3.10E+10| 6.25E−05 | 3.141592 | 4.19E−02 | where St is torsional stress; G is shear modulus (31 Gpa); r is fiber radius (62.5 um); q is angle of rotation (+/−1.57 rad); L is fiber length and $St=G*((r*q)/L)$.

It should be noted that the fiber elastic properties coupled with the oscillatory operation allow the formation of a mechanical resonant system between the birefringence inducing elements, with the possible addition of a complementary co-cylindrical torsion element such as a helicoidal spring or an elastic tube acting as a torsion rod or rotary elastic element, possibly made out of a polymer or metal, presumably shape memory alloy, and even acting as motor rotor and birefringence inducing element as a single part.

It should be appreciated that, although the above-described devices have the rotatable fiber-clamping mechanisms (birefringence-inducing elements) placed co-linearly within a common device housing, the invention embraces devices having a series of birefringence-inducing elements spaced apart along a longer piece (e.g. 30 cm) of optical fiber; and, hence, not co-linear or even in the same housing. It should also be noted that the birefringence-inducing elements need not be in pairs.

It is envisaged that, although the tubular-rotor motors described hereinbefore are particularly well-suited to rotating the fiber clamping assemblies of the above-described embodiments of the invention, they could be used in many other applications where their small size or slim profile, (for example 6-mm diameter or less) would be beneficial. Moreover, such tubular-rotor motors are not limited to rotating optical fibers but could be used to rotate other kinds of optical waveguide.

FIGS. 8 and 9(a) to 9(e) illustrate an embodiment of the invention which employs an alternative form of birefringence-inducing element, replacing the spring-loaded fiber clamping assembly of FIGS. 1 to 7.

Thus, referring to FIGS. 8 and 9(a) to 9(e), a cylindrical ferrule 52' of shape memory material has a radially-extending slot 142 extending inwards from the circumference to the middle of the ferrule to divide the ferrule 52' lengthwise into major and minor portions 52'A and 52'B. The shape memory material is deformable, temporarily, from an initial shape to a shape suitable for accommodating the filament or fiber 42, subsequent operation of the shape memory material to restore said original shape applying sufficient force to the filament/fiber 42 to induce a required degree of birefringence in the fiber.

The dimensions and elongation coefficient of the birefringence-inducing portion 52A will be determined according to the compressive forces required to induce the required degree of birefringence. It should be noted that these forces are approximately equal for any standard single mode telecommunications glass fiber having a diameter of 125 μm.

The major portion 52'A of the ferrule constitutes a birefringence-inducing element while the minor portion 52'B of the ferrule serves as a clamp to secure the ferrule to the rotor 50 of the drive motor 46. A longitudinal slot 140 extends the length of the major portion 52'A of the rotor, between one end thereof and the radial slot 142. Unlike slot 142, the slot 140 does not extend the entire diameter of the ferrule; that slot 140 extends from the circumference to a position beyond the cylindrical axis CL, leaving a vestigial hinge strip 144 of material along the edge of the longitudinal slot 140 which flexes to allow the opposed halves of the major ferrule portion 140 to pivot towards and away from each other.

A second longitudinal slot 146 orthogonal to both the radial slot 142 and the longitudinal slot 140 extends the entire length of the minor ferrule portion 52'B. This second longitudinal slot 146 extends the full diameter of the ferrule portion 52'B. Opposed concave central portions of the slot 146 form parts of a cylindrical bore 148 having a cylindrical axis coincident with the rotation/fiber axis.

The diameter of the bore 148 is selected, taking into account the elongation coefficient of the shape memory material, so that the bore 148 can accommodate the rotor 50 when the shape material is in its deformed state, yet, when the shape memory material seeks to ret to its initial state, exert sufficient force to clamp the ferrule 52 securely to the rotor 50.

Figure 8:
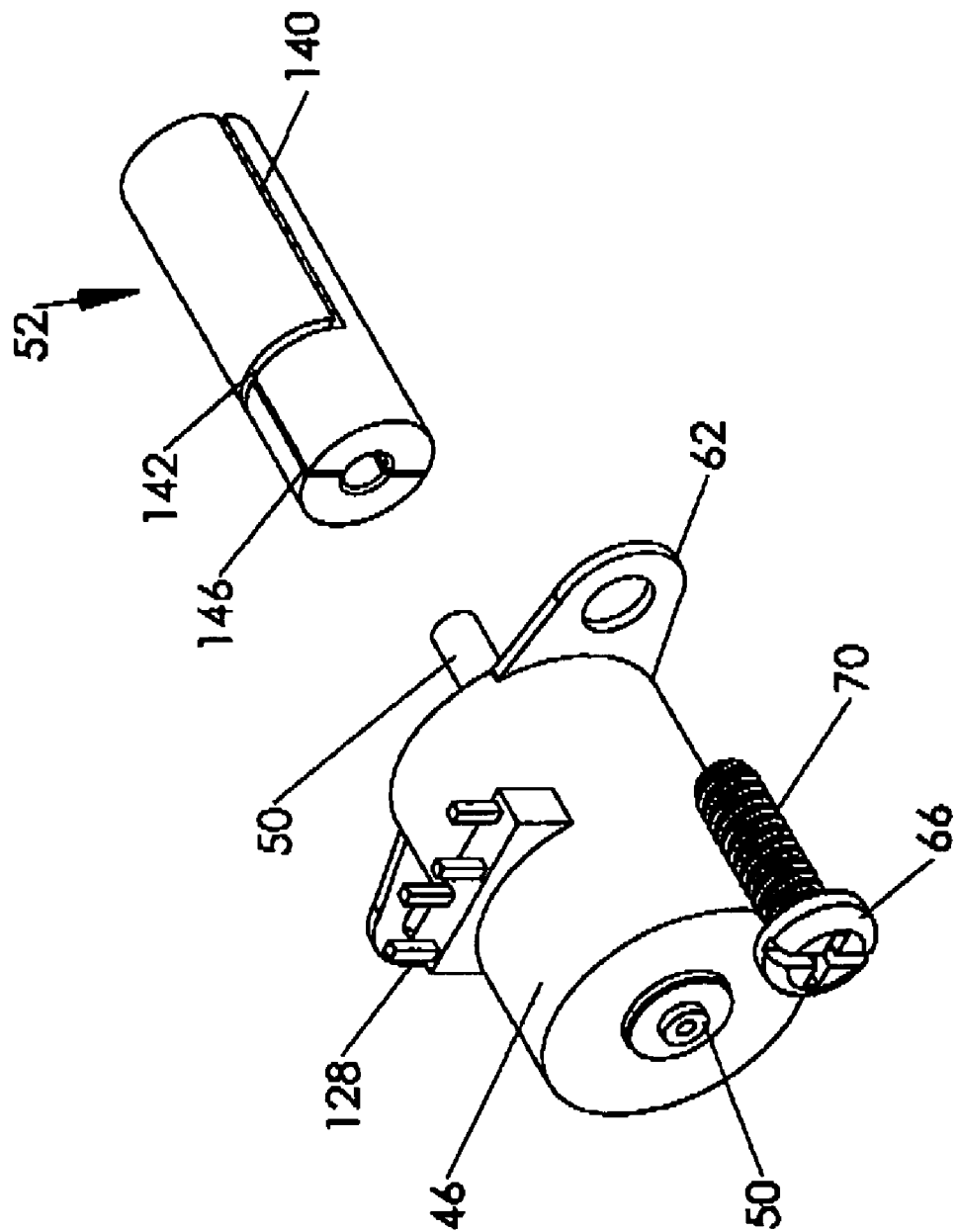
FIG. 8 is an exploded view similar to FIG. 7 but of an alternative embodiment of the invention in which the birefringence-inducing element comprises shape memory material.

FIGS. 10(*a*) to 10(*c*) illustrate a modification of the ferrule of FIGS. 8 and 9(*a*) to 9(*e*). The modified ferrule 52" of FIGS. 10(*a*) to 10(*c*) has a minor portion 52"B similar to minor portion 52'B of the ferrule 52'. The major portion 52"A of the ferrule 52" differs, however, in that it comprises two distinct halves 150 and 152 joined together by (ultrasonic) welding or adhesive as indicated at 154. The material used for any one of the two ferrule parts 52"A and 52"B and the bonding layer 154 has a temperature coefficient which differs from the temperature coefficient of the material from which the other two are made. With suitable selection of the difference between these temperature coefficients and the geometry/dimensions of the ferrule parts, variations in the force exerted by the birefringence-inducing ferrule parts with respect to temperature can compensate for differences in the birefringence of the fiber caused by temperature changes.

Suitable shape memory materials might include the superelastic monocrystal with up to 30% elasticity, conveniently comprising CuAlBe, CuAlNi or CuZaAl as disclosed in U.S. Pat. Nos. 7,066,656 and 7,121,731 (supra), the contents of which are incorporated herein by reference and to which the reader is directed for further information.

Various modifications and alternatives are envisaged without departing from the ambit of the present invention. Thus, the rotor-attachment portion 52'B or 52"B of the ferrule need not be shape memory material, the ferrule then being attached to the rotor using conventional attachment means. Alternatively, the rotor attachment portion 52'B or 52"B also may comprise shape memory material, the dimensions and elongation coefficient of such rotor-attachment portion being determined so that the ferrule is secured to rotor effectively.

The invention is not limited to the means of inducing birefringence described in the above-described embodiment, but embraces other means of inducing birefringence, for example photo induced birefringence or non-elastic frozen-in stress (e.g., via heat deformation of the fiber) which, advantageously, facilitate low cost manufacture and/or improved performance of the polarization controller.

Both the birefringence-inducing ferrule portion and the rotor-attachment ferrule portion may comprise the same shape memory material, in which case differences between the birefringence-inducing force and the rotor clamping force could be accommodated by suitable dimensioning of the ferrule portions.

It is also to be noted that the birefringence inducing element can, in fact, provoke a defined or arbitrary birefringence reaction to an external physical stimulus, such as, but not limited to, temperature, pressure and force, so as to use such a birefringence inducing element as part of a fiber sensor or transducer.

It is envisaged that the birefringence-inducing element described with reference to FIGS. 8 to 10(*c*) might be used without the drive motor for other applications, where it is sufficient to induce a required birefringence in an optical fiber without necessarily rotating the birefringence-inducing element.

Figure 13:
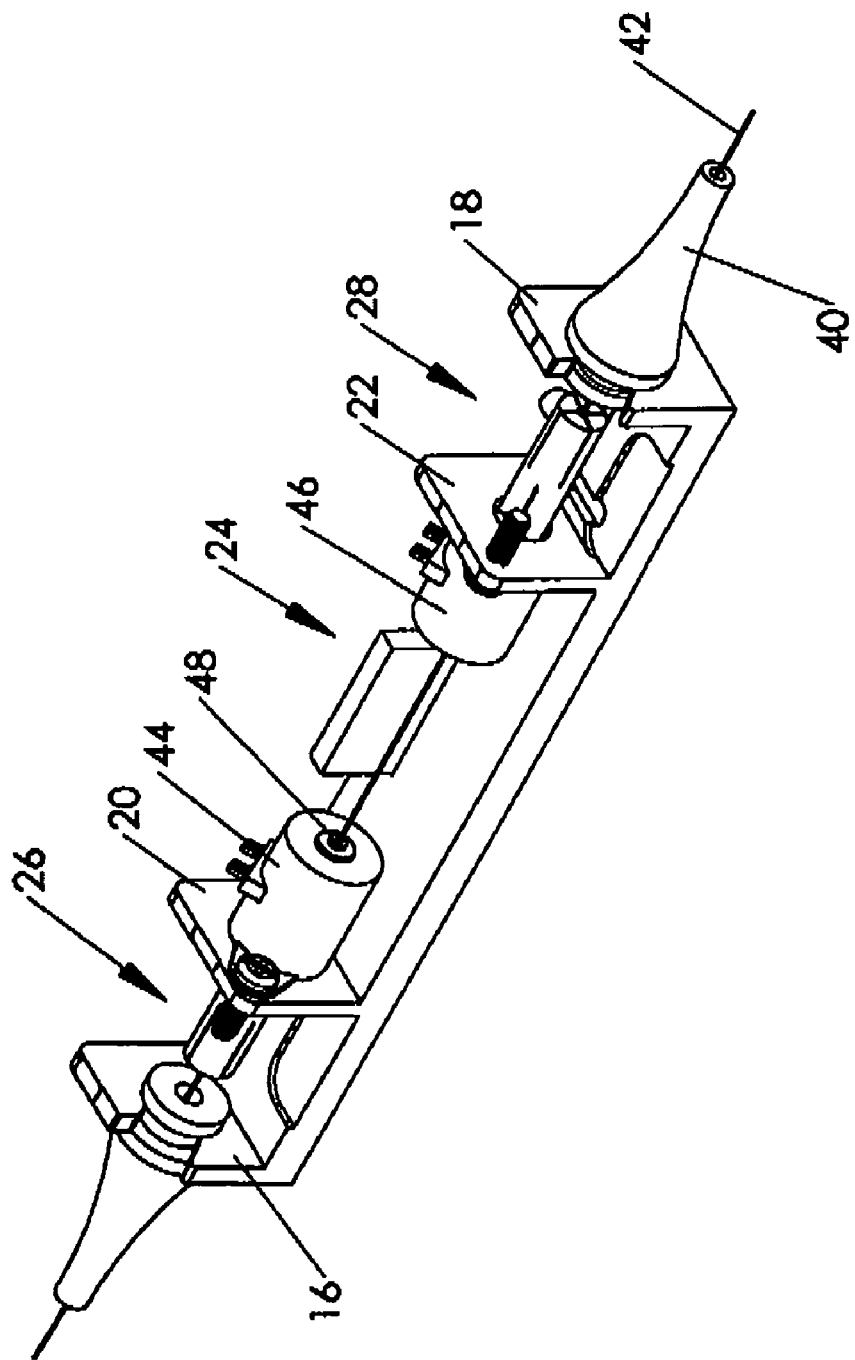
FIG. 13 is a perspective view of a second embodiment similar to that shown in FIG. 1 but of a polarization controller which uses an intrinsically-birefringent portion of optical fiber.

It is also envisaged that the birefringence-inducing elements might be omitted and at least a portion of the optical fiber that is rotated be intrinsically-birefringent. Thus, FIG. 13 is a perspective view similar to FIG. 1 but of a second embodiment of the invention in which at least a rotatable portion of the optical fiber 42 is intrinsically birefringent with a substantially linear component. The screw-clamping birefringence-inducing elements 80 and 82 of FIG. 1 have been omitted. Some parts differ slightly from that shown in FIG. 1 but, apart from changes to the ferrule, are mere design variations.

Figure 14:
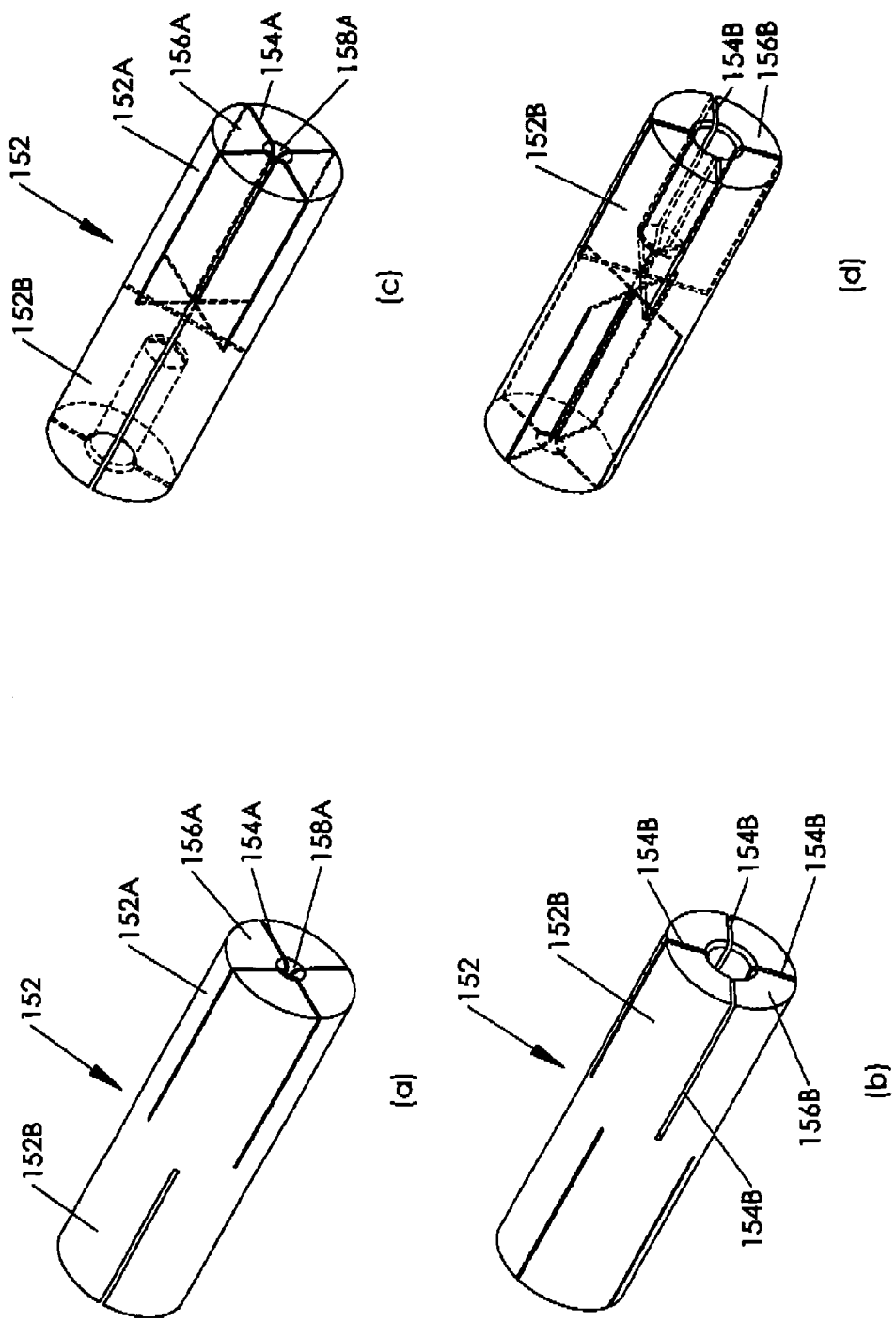
FIGS. 14(a), 14(b), 14(c) and 14(d) are perspective views of an alternative rule for securing the optical fiber to the drive motor rotor.

FIG. 13 also shows an alternative form of ferrule 152 which may be used with either embodiment of the invention. As shown in more detail in FIGS. 14(*a*)-14(*d*), the ferrule 152 is similar to that shown in FIG. 8 in that it has two portions 152A and 152B. for receiving and clamping the fiber 42 and the rotor 48/50, respectively. As shown in FIGS. 14(*a*) and 14(*c*), fiber clamping portion 152A has four longitudinal slots 154A equally-spaced angularly to define four jaws 156A and a coaxial hole 158A. Both the slots 154A and the hole 158A extend approximately half the length of the ferrule 152. The diameter of hole 158A is such that slight flexing of the jaws 156A permits insertion of the fiber 42 and resilience of the jaws 156A applies a required pressure to the fiber coating to hold the fiber firmly and prevent rotation relative to the ferrule.

Similarly, rotor clamping portion 152B has four longitudinal slots 154B equally spaced angularly to define four jaws 156B and a coaxial hole 158B. The slots 152B are offset angularly relative to slots 156A by 45 degrees. In this case, the diameter of hole 158B is larger so that it can receive the end portion of the rotor 48/50 between the jaws 156B is which flex slightly to receive the rotor 48/50. The jaws 152B have sufficient resilience to clamp onto the rotor 48/50 firmly and ensure that the ferrule 152 will rotate with it. The ferrule 152 may be made of elastic or super-elastic material. In this context, "elastic" means inherent flexibility of the clamping structure forming a monolithic anvil-spring element that compresses the fiber. Shape memory alloys (SMAs) are useful for their super-elastic properties; however, other materials such as aluminum, plastics, beryllium-copper or other spring materials could be used instead.

Figure 15:
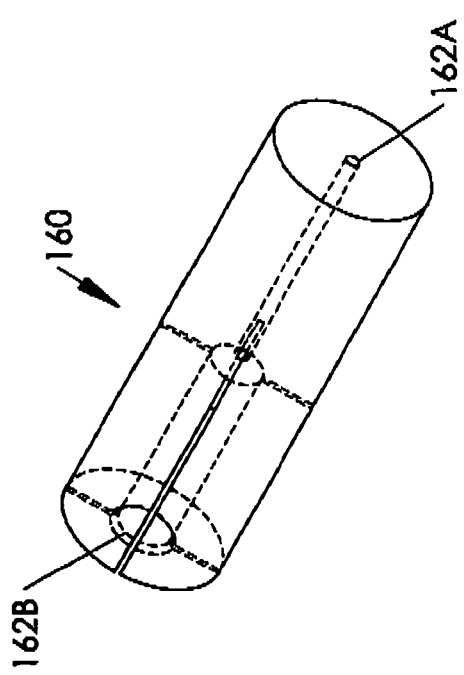
FIG. 15 is a perspective view of another alternative form of ferrule.

FIG. 15 is a perspective view of another ferrule 160 which may be used where it does not need to provide clamping to induce birefringence. As shown, unlike the ferrules of FIGS. 8-10(*c*) and 14(*a*)-14(*d*), ferrule 156 has no longitudinal slots but has two coaxial holes 162A and 162B to receive the fiber 42 and rotor 48/50, respectively. In this case, the holes are clearance fits for the rotor and fiber which are secured thereto by bonding, soldering, welding (e.g., ultrasonic welding), and so on, as appropriate.

Figure 16:
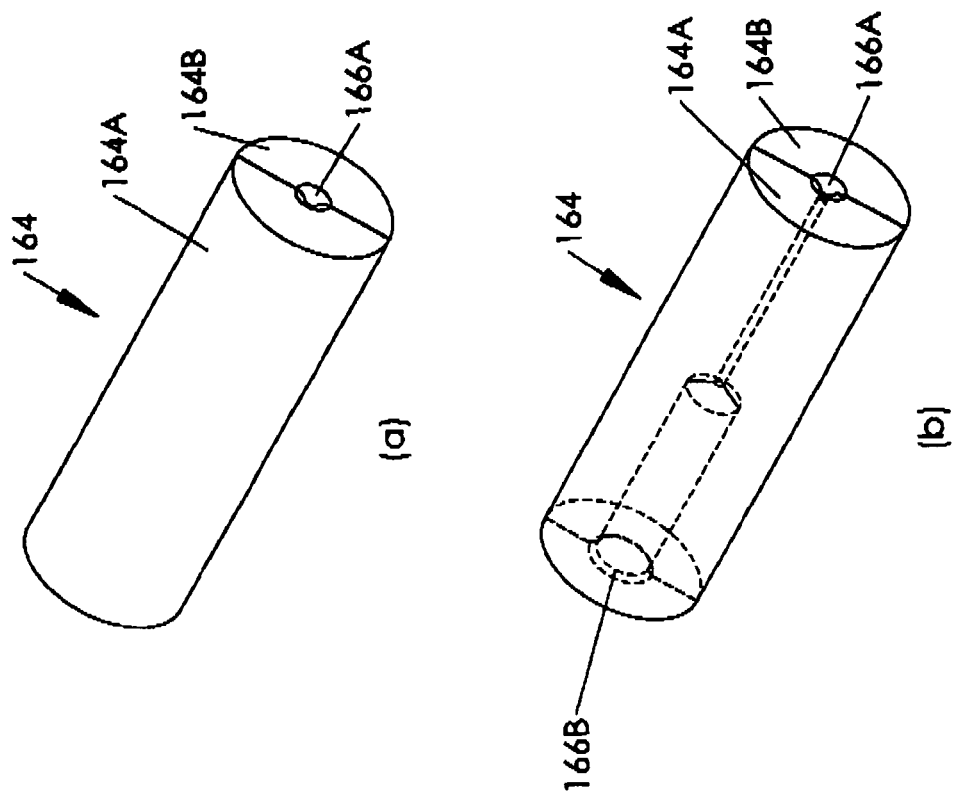
FIGS. 16(a) and 16(b) are perspective views of yet another alternative form of ferrule.

FIGS. 16(*a*) and 16(*b*) are perspective views of a ferrule 164 which is similar to that of FIG. 15 in that it has two holes 166A and 166B to receive the fiber 42 and rotor 48/50, respectively, but differs in that it is split into two semi-cylindrical halves 164A and 164B, respectively. In use, the two parts 164A and 164B are assembled around the fiber 42 and rotor 48/50 and their juxtaposed radial surfaces 166A and 166B attached together by bonding, soldering, welding (e.g., ultrasonic welding) or other suitable means.

Suitable materials for these alternative ferrules include those specified for the ferrules of FIGS. 8 to 10(*c*).

It should be noted that the distinct mode of operation of the ferrules shown in FIGS. 15 and 16 does not rely on the elastic deformation of a material to apply frictional forces to the fiber, but rather on the use of an added material or energy in the case of ultrasonic welding to either lock the parts together to generate frictional forces on the fiber or to directly bond the fiber using the adhesive properties of the added materials or materials matrix embedment in the case of ultrasonic welding.

It should be appreciated that, although the ferrules of FIGS. 14(a)-(d), 15 and 16 are especially suitable for connecting an optical fiber to a motor rotor in a polarization control device, as described hereinbefore, they could also be used in other situations to apply radial compressive force to a mechanical element, creating a mechanical coupling between the fiber, and the (external) mechanical element then used to transmit either or all of torsion, axial stretch, axial compression, bend or shear forces to the fiber.

The mechanical element can be a motor or other rotational means used to rotate a portion of fiber in response to a command or a stimulus, e.g., optical torque load cell, etc. The mechanical element can be an elastic tube such as a bellows to apply tensional (axial) forces on the fiber i.e. optical pressure gauge, etc. The mechanical element can be a mechanical structure which response is to be monitored with regards to external stimulus i.e. optical strain gauge, optical load cell. The mechanical element can be a bulk optical assembly such as to form a Fabry-Perot cavity, a collimator, a periscope, endoscope.

It should be noted that the ferrules shown in FIGS. 15 and 16 may be used with embodiments of the invention where attachment is required without inducing birefringence.

In each of the above-described embodiments of the invention, it is implicit that the optical fiber 42 is a single-mode optical fiber. If optical fiber 42 is replaced by a multimode fiber, however, and light input to the device therein comprises multiple transverse guided modes, the polarization controlling device may be operated so as to produce a time-variation in the modal interference pattern ("speckle") of the light leaving the fiber, whether it be the fiber of the polarization controlling device itself or of another multimode fiber in the optical path downstream from the device. Such variation in the modal interference pattern is believed to arise from the fact that the SOP changes effected by the polarization controlling device are different for different transverse modes propagating in the multimode fiber, thereby rapidly changing the spatial interference pattern.

If the speed of this time variation (scrambling) is slower than the temporal resolution (i.e. inverse of the detection bandwidth) of an opto-electronic detection means, this device could be used to determine the "speckle dependent loss" in a multimode fiber link, by measuring the maximum and minimum detected powers over a suitable duration. (The mean loss, if desired, would then be calculated from the arithmetic means of these maximum and minimum values.) The detection means is disposed so as to detect all or substantially all of the optical power exiting the multimode fiber link. Such speckle dependent loss could arise from, for instance, macrobends, offsets in the respective cores of mated multimode connectors, splices, etc.

This device could also be used for the characterization of the optical near field of light exiting a multimode fiber. For instance, such a device could be advantageously applied to replace a so-called fiber shaker for various applications. In particular, the International Electrotechnical Commission Standard document IEC 61280-1-4 entitled "Collection and reduction of two-dimensional nearfield data for multimode fiber laser transmitters", the contents of which are incorporated herein by reference, "sets forth a standard procedure for the collection of two-dimensional fibre optic nearfield grayscale data" (Section 1.1), i.e. spatially-resolved optical power in the near field. The document describes several ways of measuring this data. One example is described in Section 3.5 of the document thus: "Suitable optics shall be provided which project the magnified image of the output end of the test jumper assembly onto the receiving CCD chip such that the CCD can measure the entire nearfield flux distribution. These optics shall not restrict the numerical aperture of the formed image." Furthermore, Section 5.2.2, para 1, op cit states "individual pixels mak[e] up the data" and hence provide spatially-resolved power ("flux") measurements. This procedure further requires the use of a fiber shaker to "ensure that optical speckle is averaged out, with only a few percent of residual ripple or noise due to speckle being allowed to remain in the measured nearfields" (Sec. 3.3. para 1, op cit). A prior art fiber shaker is described in TIA/EIA-455-203, a document published by the Telecommunications Industry Association, but this fiber shaker is much more bulky and awkward to implement in practical applications than the polarization controlling device described in the present application.

It should be noted that the speckle averaging described above could be effected by, for instance, limiting the detection bandwidth or averaging the acquired data in the subsequent signal processing, thereby defining an "effective measurement bandwidth" for the measurement.

INDUSTRIAL APPLICABILITY

It should be appreciated that, although the fiber rotator mechanisms 44/80 and 46/82 described hereinbefore are especially suitable for use in the above-described polarization controlling devices embodying the invention, they are not limited thereto; rather, such fiber rotator mechanisms could be used in other applications. For example, such a fiber rotator unit could be used for aligning the axes of PM fiber, or to provide a rotational degree of freedom of a fiber used for deliver or sensing optical energy delivered to samples in microscopy and therapeutics. It will be appreciated that, in those applications, the motor would not necessarily be coupled to a birefringence-inducing element.

Although embodiments of the invention have been described and illustrated in detail, it is to be clearly understood that the same are by way of illustration and example only and not to be taken by way of limitation, the scope of the present invention being limited only by the appended claims.

The invention claimed is:
1. A polarization control device for controlling state of polarization (SOP) of light propagating along an optical fiber, the polarization controlling device comprising:
   drive motor means comprising a stator and a tubular rotor;
   fiber squeezer means mounted to the tubular rotor for rotation therewith;
   said optical fiber extending through said tubular rotor and said fiber squeezer means,
   said fiber squeezer means squeezing a portion of said fiber to secure said fiber to said fiber squeezer means for rotation therewith and to induce a predetermined linear birefringence in said portion;
   the drive motor means being operable to rotate the fiber squeezer means and therewith said portion of the optical fiber and thereby control said state of polarization (SOP) of light propagating through said optical fiber.

2. A device according to claim 1, wherein said fiber squeezer means comprises first and second anvil members having respective anvil surfaces juxtaposed to receive said fiber portion therebetween, and spring-loaded screw-clamping means for biasing the first and second anvil members together so as to apply a predetermined compressive force to the optical fiber portion extending between said juxtaposed respective anvil surfaces, thereby to induce said birefringence.

3. A polarization control device according to claim 1, wherein the fiber squeezer means comprises a ferrule having a central bore sized to accommodate the optical fiber, at least a part of the ferrule comprising a shape memory material deformable by mechanical force and/or heating to increase the bore size temporarily to accommodate the fiber, such that, upon removal of the mechanical force or heating, the shape material attempts to reduce the bore size, such that a predetermined transverse compressive force is applied to said fiber so as to induce said predetermined birefringence therein.

4. A device according to claim 1, further comprising a control unit for controlling the drive motor means to obtain a desired rotation of the portion of the optical fiber.

5. A polarization control device according to claim 3, wherein the ferrule comprises parts having different temperature coefficients selected, in conjunction with physical dimensions of the ferrule, so as to vary the transverse compressive force to compensate at least partially for temperature-dependent changes in the birefringence of the optical fiber.

6. A device according to claim 4, wherein the control unit is operable for controlling the drive motor means to rotate the rotor through a predetermined angle to a set position.

7. A device according to claim 4, wherein the control unit controls the drive motor means to rotate the rotor to a series of different angular positions in succession to select in succession a multiplicity of SOPs distributed around the Poincaré sphere.

8. A device according to claim 4, wherein the control unit controls the drive motor means to cause the fiber portion to rotate in an oscillatory fashion over a range of rotation angles so as to modulate SOP of light propagating along the fiber.

9. A polarization control device for controlling state of polarization (SOP) of light propagating along an optical fiber, the polarization controlling device comprising at least first and second drive motor means mutually-spaced along said optical fiber, each comprising:
   a stator and a tubular rotor;
   said optical fiber extending through said tubular rotor of each drive motor means and being coupled to each said tubular rotor for rotation therewith, and
   a birefringence-inducing element for inducing a predetermined linear birefringence in a respective one of first and second mutually-spaced portions of the optical fiber;
   the polarization control device further comprising control means for controlling said first and second drive motor means to rotate said first and second portions, respectively, and thereby control state of polarization (SOP) of light propagating through said optical fiber, wherein the control unit is operable to control respective rotation angles of the at least two birefringence-inducing elements according to predetermined criteria so as to select in succession a multiplicity of SOPs distributed substantially uniformly around the Poincaré sphere.

10. A device according to claim 9, wherein each of said birefringence-inducing elements comprises means for applying a transverse compressive force to a respective one of said first and second portions of said fiber so as to induce said birefringence therein.

11. A device according to claim 9, wherein each of said birefringence-inducing elements comprises spring-loaded screw-clamping means for clamping a respective one of said first and second portions of the optical fiber to apply a transverse compressive force to said respective one of said first and second portions of said optical fiber and thereby induce said birefringence.

12. A device according to claim 9, wherein each of said birefringence-inducing elements comprises first and second anvil members having respective anvil surfaces juxtaposed to receive a respective one of said first and second portions of the optical fiber therebetween, and means for biasing the first and second anvil members together so as to apply a predetermined compressive force to said respective one of said first and second portions of the optical fiber extending between said juxtaposed respective anvil surfaces.

13. A device according to claim 9, wherein each of the birefringence-inducing elements is secured to a rotor of a respective drive motor means for rotation therewith and the corresponding portion of the optical fiber is secured to the respective birefringence-inducing element for rotation therewith.

14. A device according to claim 9, wherein the birefringence inducing element comprises a ferrule attached co-axially to the tubular rotor so that the optical fiber extends through both the ferrule and the rotor, at least a part of the ferrule comprising an elastic mechanical clamp means applying transverse compressive force to said fiber to induce said predetermined linear birefringence therein.

15. A device according to claim 14, wherein the said elastic mechanical clamping means comprises shape memory material deformable temporarily from an initial shape to a shape suitable for accommodating the fiber, said transverse compressive force being generated by subsequent attempted restoration of the shape memory material to said original shape.

16. A polarization control device for controlling state of polarization (SOP) of light propagating along an optical fiber, the polarization controlling device comprising:
   drive motor means comprising a stator and a tubular rotor;
   said optical fiber extending through said tubular rotor and being coupled to said tubular rotor for rotation therewith; and
   a birefringence-inducing element for inducing a predetermined linear birefringence in a portion of the optical fiber;
   the drive motor means being operable to rotate the portion of the optical fiber and thereby control said state of polarization (SOP) of light propagating through said optical fiber,
   wherein said birefringence-inducing element comprises first and second anvil members having respective anvil surfaces juxtaposed to receive said fiber portion therebetween, the anvil members being connected together at one side by hinge means and pivotable relative to each other, and spring-loaded screw-clamping means for biasing the first and second anvil members together so as to apply a predetermined compressive force to the optical fiber portion extending between said juxtaposed respective anvil surfaces, thereby to induce said birefringence.

17. A device according to claim 16, wherein the screw-clamping means comprises at least one adjustment screw and a compression spring for transmitting force from the screw to bias the first anvil member resiliently towards the second anvil member, the screw permitting adjustment of the biasing force.

18. A device according to claim 16, wherein the screw-clamping means comprises two adjustment screws and respective compression springs disposed either side of the longitudinal axis of the fiber, each compression spring for transmitting force from the associated adjustment screw to bias the first anvil member resiliently towards the second anvil member, the screws permitting adjustment of the biasing force.

19. A device according to claim 16, wherein the birefringence-inducing element is secured to said rotor for rotation therewith and said portion of the optical fiber is secured to the birefringence-inducing element for rotation therewith.

20. A polarization control device for controlling state of polarization (SOP) of light propagating along an optical fiber, the polarization controlling device comprising:
drive motor means comprising a stator and a tubular rotor;
said optical fiber extending through said tubular rotor and being coupled to said tubular rotor for rotation therewith,
a birefringence-inducing element for inducing in a portion of the optical fiber a predetermined linear birefringence;
the drive motor means being operable to rotate the portion of the optical fiber and thereby control said state of polarization (SOP) of light propagating through said optical fiber,
wherein the birefringence inducing element comprises a ferrule attached co-axially to the tubular rotor so that the optical fiber extends through both the ferrule and the rotor, at least a part of the ferrule comprising shape memory material deformable when heated temporarily from an initial shape to a shape suitable for accommodating the fiber, subsequent cooling of the shape memory material causing the shape memory material to attempt to restore said original shape thereby applying transverse compressive force to said fiber to induce said predetermined linear birefringence therein.

21. A device according to claim 20, wherein the ferrule comprises two substantially semi-cylindrical members cooperating to form a portion of the ferrule, the semi-cylindrical members being bonded together, either or both of the bonding material and the material of one of the semi-cylindrical members having a different temperature coefficient as compared with the temperature coefficient of the material of the other of said semi-cylindrical members, the temperature coefficients being preselected to compensate at least partially for temperature-sensitive variation of the birefringence of the portion of the optical fiber.

22. A device according to claim 20, wherein the birefringence-inducing element is secured to said rotor for rotation therewith and said portion of the optical fiber is secured to the birefringence-inducing element for rotation therewith.

23. A device according to claim 20, wherein the ferrule comprises two substantially semi-cylindrical members cooperating to form a portion of the ferrule, the semi-cylindrical members being bonded together.

24. A device according to claim 23, wherein said portion of the ferrule also comprises shape memory material, dimensions and elongation coefficient of said portion being determined so that the ferrule is attached to the rotor securely.

25. A device according to claim 23, wherein both said part of the ferrule and said portion of the ferrule comprise the same shape memory material.

26. A method of measuring speckle-dependent loss of a device-under-test and/or fiber link-under-test (DUT) using a polarization control device comprising drive motor means comprising a stator and a tubular rotor, a multimode optical fiber extending through said tubular rotor, a portion of said fiber exhibiting a predetermined linear birefringence and being coupled to said tubular rotor for rotation therewith, the drive motor means being operable to rotate the portion of the optical fiber and thereby control states of polarization (SOP) for respective different transverse modes comprising light propagating through said optical fiber, the method comprising the steps of:
propagating multimode light having multiple transverse guided modes through said multimode optical fiber and subsequently into said DUT, controlling the drive motor means to rotate said portion of optical fiber so as to produce a time-varying modal interference pattern of the light exiting the DUT, and subsequently collecting and detecting substantially all of said exiting light over a prescribed time period, said speckle-dependent loss being determined from a ratio of maximum and minimum power levels of the detected light over said prescribed time period.

27. A method according to claim 26, wherein the polarization control device comprises at least two drive motor means associated with at least two mutually-spaced portions, respectively, of said optical fiber.

28. A method of determining a near field spatial profile of multimode light under test (MLUT) using a polarization control device to control states of polarization (SOP) corresponding to respective different transverse modes of light exiting a multimode optical fiber,
the polarization control device comprising drive motor means comprising a stator and a tubular rotor, said multimode optical fiber extending through said tubular rotor, a portion of said fiber exhibiting a predetermined linear birefringence and being coupled to said tubular rotor for rotation therewith,
the method comprising the steps of:
operating the drive motor means to rotate said portion of the optical fiber and thereby cause time-varying changes in optical speckle of the light exiting said fiber;
undertaking a plurality of power measurements of said multimode light under test (MLUT) that are spatially distributed in the near field, each measurement detecting a spatial fraction of total optical power with an effective measurement bandwidth less than a rate at which said time-varying changes occur, said plurality of measurements determining said near field spatial profile.

29. A method according to claim 28, wherein the polarization control device comprises at least two drive motor means associated with at least two mutually-spaced portions, respectively, of said optical fiber.

* * * * *